United States Patent [19]

Wilhelmi

[11] Patent Number: 4,986,650

[45] Date of Patent: Jan. 22, 1991

[54] SUN GLASSES FOR WATER SPORTS

[76] Inventor: Gene Wilhelmi, 419 Main St., No. 74, Huntington Beach, Calif. 92648

[21] Appl. No.: 363,696

[22] Filed: Jun. 9, 1989

[51] Int. Cl.$^5$ .............................................. G02C 3/00
[52] U.S. Cl. .................................... 351/156; 351/157; 351/120
[58] Field of Search ............... 351/111, 120, 123, 156, 351/157

[56] References Cited

U.S. PATENT DOCUMENTS 3,907,410  9/1975  Richmond et al. ................. 351/120
4,129,362  12/1978  Lorenzo ............................. 351/120

FOREIGN PATENT DOCUMENTS 1286780  1/1969  Fed. Rep. of Germany ...... 351/120

*Primary Examiner*—Paul M. Dzierzynski
*Attorney, Agent, or Firm*—Francis X. LoJacono

[57] ABSTRACT

The invention relates to sun glasses that are particularly designed for use in water sport activities such as surfboarding and bodysurfing or other activities where the user thereof might inadvertently lose the glasss while in worn in the normal manner or when not in use and hung around the neck of the user. The sun glasses comprises a main frame member which support the glasse members therein and a unitary head band of semihard material that is formed having a pair of side temple members and an angularly disposed bowed section with the bowed section being bent downwardly from the side members so as to be located approximate the nape of the neck. The main frame is hingedly attached to the distal ends of the side temple members whereby the main frame can be adjustably positioned in one of two positions. In a use position the frame is positioned in a vertical arrangement relative to the side members and in a horizontal position relative to the side members when supported around the neck in a non-use arrangement.

7 Claims, 2 Drawing Sheets

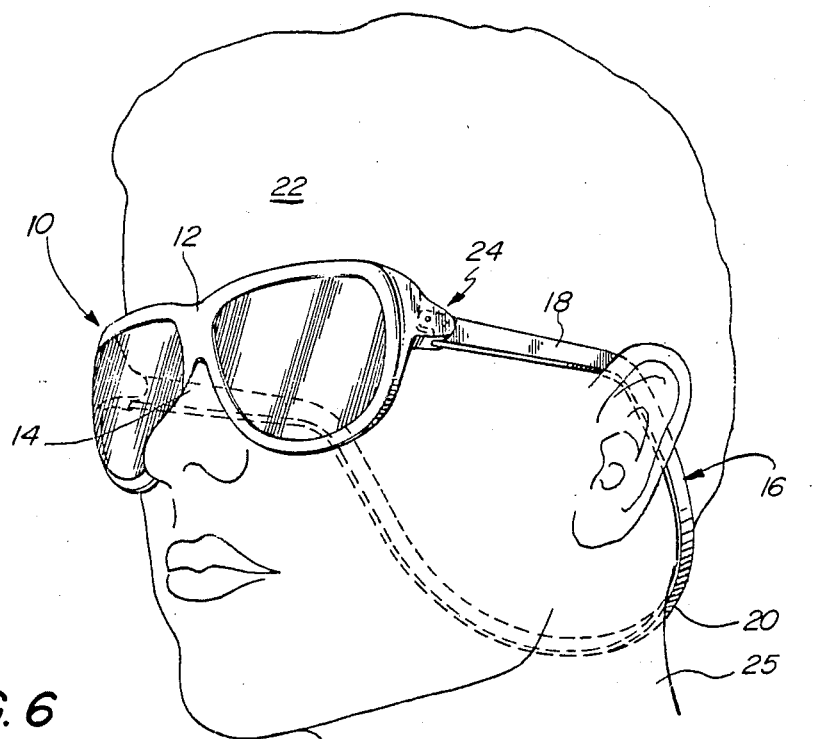
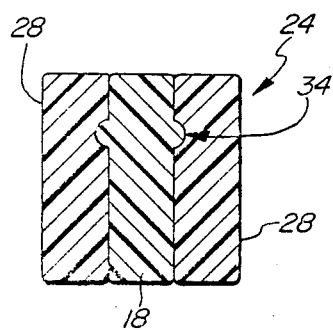
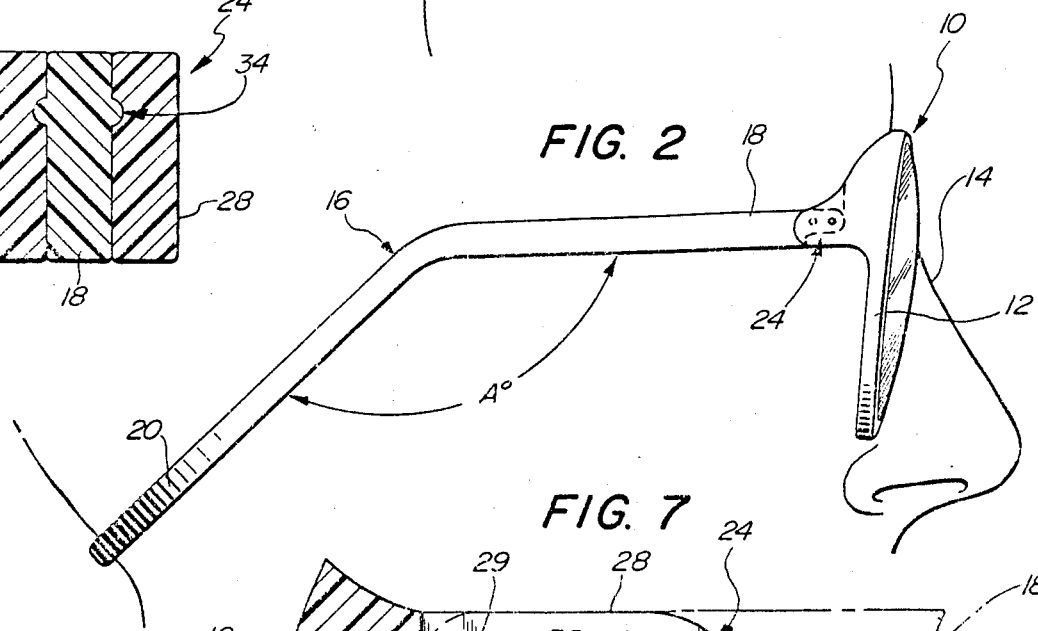
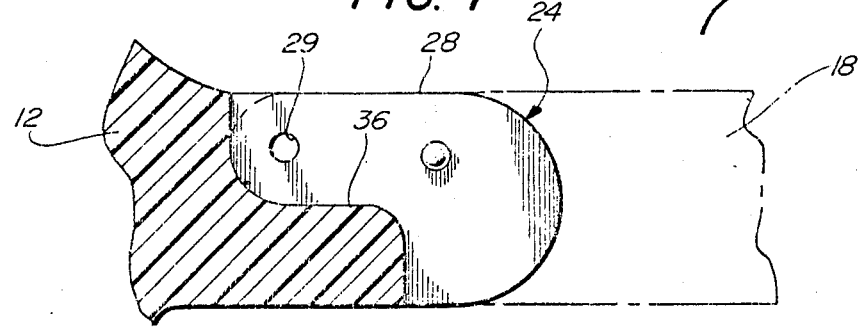

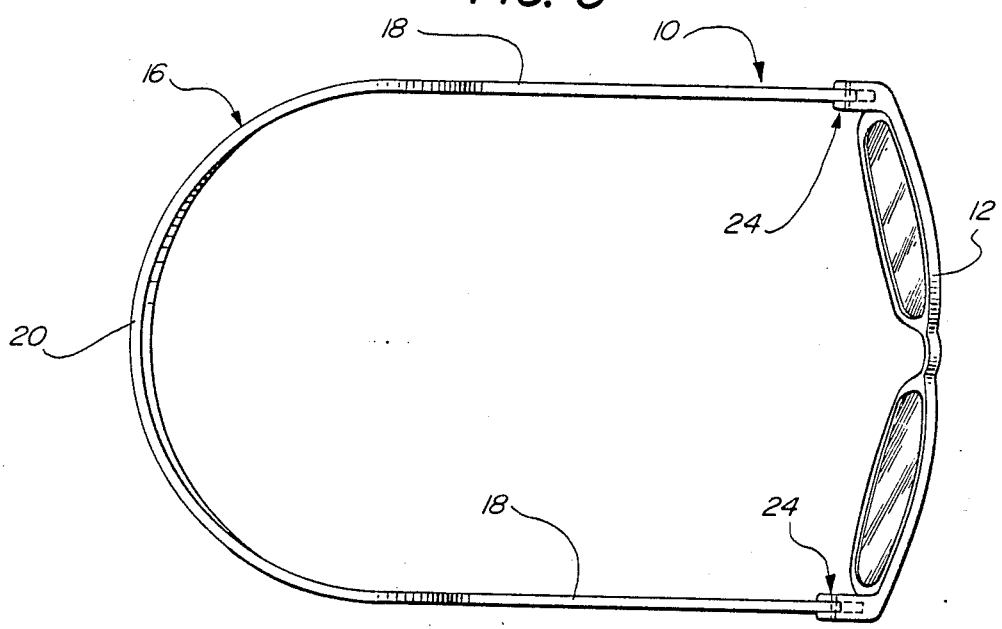
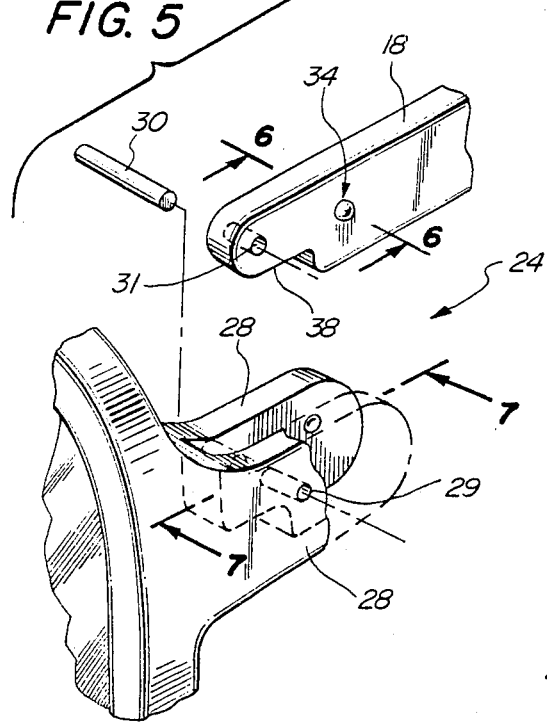
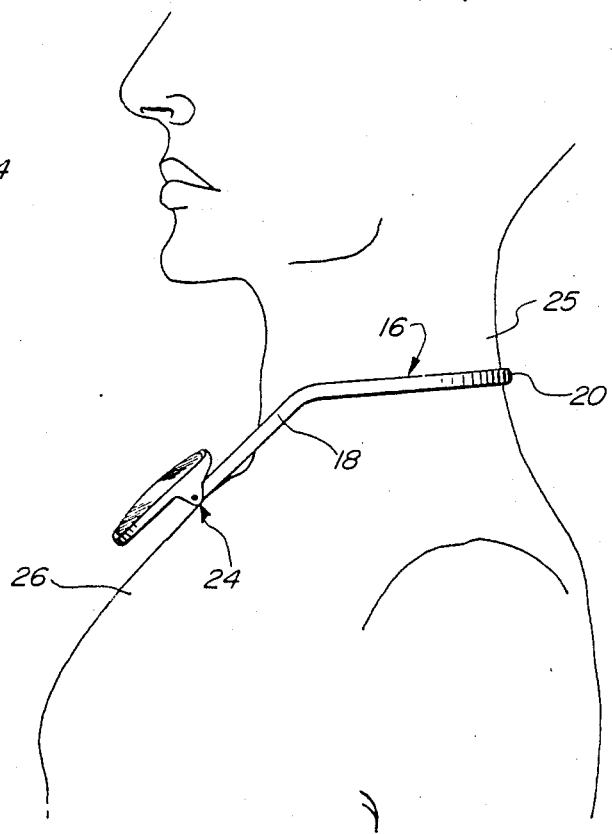

SUN GLASSES FOR WATER SPORTS

BACKGROUND OF THE INVENTION

1. Field of the Invention

The present invention relates generally to sun glasses, and in more particularly designed for use with sun glasses that can be worn during water sport activities. The sun glasses are formed having a substantially semi-hard unitary plastic head band member that is defined by the combination side temple, members with the distal ends of the side temple members being formed with a locking hinge whereby the main frame section is adjustable to two positions. A vertical position is used for wearing over the eyes in a normal manner and a horizontal position is employed when supported about the user's neck in a non-use mode.

2. Description of the Prior Art

As is well known in the art, various problems and difficulties are encountered in providing suitable sun glasses for use in water sports and more particularly the sport of surfing.

Many types of eyeglass retainers have been tried and suggested. However, these devices have various limitations that restrict their use and are often unsuitable for use during active water sports, more particularly the sport of board-surfing, body surfing and the like. Such known devices consist of a band or strap-like member that includes an attaching means at each end of the strap or band. The attaching means is generally a fastener clip or other suitable fastener that is secured to the ends of the retainer and adapted to be removably attached to the temple pieces of a pair of eyeglasses. This arrangement is often provided with a retainer strap having a length sufficiently long to allow the eyeglasses to hang loosely from the person's neck when they are not in position for use. However, when positioned for use they are generally loosely located behind the head of the user thereof.

As examples of such eyeglass retainer devices, the following U.S. patents are herein disclosed.

First, Daniels U.S. Pat. No. 1,819,738 discloses eyeglasses that include a bow that extends over the head in straddling relation thereto and, by resting upon the rear portion of the top of the head, supports the weight of the glasses.

In Marker U.S. Pat. No. 3,782,812 there is disclosed a pair of goggle glasses that include an elastic back that is adjustable to fit the head of the wearer thereof.

Lorenzo in U.S. Pat. No. 4,129,362 discloses an eyeglass structure the includes a male and female connection of the lens-holding ring of the glasses and a band connecting the temple pieces of spring or resilient material to gently grip the sides and rear of the head of a wearer to distribute the load, wherein the plane of the lens holding rings may be adjusted through a range of generally vertical planes.

Further, Neidell the U.S. Pat. No. 4,187,006 discloses flip-down sunglasses wherein a fixed part is attached to the wearer's forehead by means of ear pieces and an adjustable strap. A movable part is pivotally mounted to the fixed part and carries a sun visor. The sun visor may be locked into position both vertically and horizontally by means of grooves carried on flexible arms joined to the fixed part to engage ribs carried on the movable part.

In Winger U.S. Pat. No. 4,541,696 there is disclosed an eyeglass retainer comprising a tubular elastic knit cord made adjustable by sliding the temple pieces of eyeglasses into the tubular ends of the cord. The cord is a unitary piece.

Perry discloses in U.S. Pat. No. 4,696,556 an eyeglass retainer headband that comprises a tube of pliable material having two open ends, with a tube segment at each end being turned into itself to form a double-walled end portion of somewhat reduced inner diameter and increased stiffness while also providing a smoothly contoured or finished edge around each opening of the tube to prevent fraying of the fabric.

The devices as disclosed above do not suitably lend themselves to addressing the problem of losing sun glasses under the conditions and circumstances that occur when surfing. That is, when wearing glasses in the water there is a tendency sometimes to forget and leave them on. If a spill takes place, the force of hitting the water will knock the glasses off the person's head. Or, if the glasses are hung around the users neck, they too can be lost by a fall into the water at high speed. The strap of the retainer often is disengaged from the temple pieces and is readily lost.

The applicant has found that certain arrangements of the strap member must be employed to prevent glasses from being forced over the head of the person during such water activities, and that such arrangements to allow for the safe use of glasses under the above described conditions have not been taken into consideration in any of the above known patents.

OBJECTS AND ADVANTAGES OF THE INVENTION

Accordingly, it is an important object to provide a pair of sun glasses that is so structure so as not to be forcibly removed from around one's neck while actively engaging in various water sports as described above. This is accomplished by forming a pair of glasses wherein a unitary bowed head band is hingedly attached to the main frame of the glasses. The head band or strap is a single strip of semihard plastic or like material that is bowed to a somewhat C-shaped configuration having a pair of oppositely positioned temple sections interconnected by a bowed rear midsection that engages the nape of the neck when the main frame rest on the bridge of one's nose.

Another object of the present invention is to provide a pair of sun glasses that includes a means for hinging the head band to the main frame of the glasses whereby the main frame can be rotated to a horizontal position, thus allowing the sun glasses to be hung around the nect of the user thereof. In this arrangement, the glasses lie flat against the chest of the user whereby the force of the water pushes the glasses firmly against the chest rather than lifting the glasses over the head of the wearer thereof.

Still another object of the invention is to provide a device of this character wherein the hinge member includes a locking device to allow the main frame to be locked in a vertical position while resting on one's nose during regular use, but yet permits one to snap the main frame to a horizontal position in a non-use mode when hung about the neck.

A further object of the present invention is to provide a pair of sun glasses of this character that has few moving parts and is easy to operate so as to place the glasses in a more secure position so as not to be accidentally lost while surfing.

A still further object of the invention is to provide a pair of water-sports type sun glasses that overcomes the shortcomings of the prior art and answers problems not considered heretofore.

It is still another object of the invention to provide a pair of sun glasses of this character the is relatively inexpensive to manufacture and is simple and rugged in construction.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements of modes of operation that are properly within the scope of the appended claims.

BRIEF DESCRIPTION OF THE DRAWING FIGURES

With the above and related objects in view, the invention consists in the details of construction of parts, as will be more fully understood from the following description, when read in conjunction with the accompanying drawings and numbered parts, in which:

FIG. 1 is a pictorial view of the present invention shown mounted on a person's head in a normal in-use mode;

FIG. 2 is a side elevational view of the left side of FIG. 1, wherein the main frame of the glasses is mounted on the bridge of the nose with the head band section being positioned along the nape line of the neck;

FIG. 3 is a top-plan view of the sun glasses showing how the C-shaped bow of the head band and the side temple members are formed from a unitary strip;

FIG. 4 is a side elevational view of the sun glasses hung around the neck in a non-use mode;

FIG. 5 is an exploded view of the hinge connection;

FIG. 6 is an enlarged cross-sectional view of the hinge member taken substantially along line 6—6 of FIG. 5; and FIG. 7 is an enlarged cross-sectional view taken substantially along line 7—7 of FIG. 5.

DETAILED DESCRIPTION OF THE INVENTION

Referring more particularly to FIG. 1, there is shown an overall pictorial view of the sun glasses of the present invention, generally indicated at 10, being mounted in the preferred use mode wherein the main frame section, designated at 12, is in a vertical position resting on the bridge of nose 14. The head band member 16 is looped over the ears and is located about the nape of the neck. The use mode position is also illustrated in FIG. 2. Accordingly, the head member or band 12 is formed as a single strip of semihard plastic that is defined by a pair of oppositely disposed side or temple members or sections 18. In the use mode, the temple sections are in a generally horizontal position extending rearwardly of the main frame section 12 and are supported in the typical manner over one's ears. The rear bowed section 20 is angularly bent downwardly to be located at the base of the head or the nape of the neck. Thus, with any upward force, such as by a wave action while surfing, the main frame will engage forehead 22, thus preventing the glasses from lifting over the head and being lost. Accordingly, angle A section, as seen in FIG. 2, must be rigid enough not to allow the angle to change. The preferred angle is approximately 140 degrees, but should not be more than 150 or less than 130 degrees. This range of angles allows ease in putting the glasses over the average head yet still provides a means for inadvertent removal thereof.

In FIG. 4, glasses 10 are shown in a non-use mode wherein the main frame section 12 is illustrated as being hinged outwardly from the side temple members 18. That is, main frame 12 is positioned in substantially the same plane as the plane of the side temple pieces 18. The hinge means, designate generally at 24, allows main frame 12 to be positioned in either a vertical arrangement (use mode) or a horizontal arrangement (non-use mode). As mentioned above, FIG. 1 shows the use mode or position and FIG. 4 shows the non-use mode or position, wherein the non-use position would be employed when the wearer thereof is riding a surfboard or body surfing. The glasses are lowered around the neck 25 so that the temple members 18 rest on the chest 26, with the main frame being in a substantially flat position against the wearer's chest. Accordingly, the opening defined by the head band is smaller and thus prevents accidental removal of the glasses when one falls from the surfboard or during contact with the water while bodysurfing. Again it should be noted that the glasses of the present invention are useful under various conditions that would otherwise cause accidental loss of the glasses.

Referring now to the hinge means 24 in FIG. 5, the hinge means 24 is shown comprising a pair of ear members 28 extending outwardly from the main frame and located below the upper edge thereof. Each ear member 28 includes aligned holes 29 to receive hinge pin 30. Thus, the distal end of each temple piece 18 is also provided with a matching hole 31 whereby each temple piece 18 is hingedly attached to the respective ear members. However, both a stop means 32 and a locking means 34 are also provided within the hinge means 24. The stop means 32 comprises a shoulder member 36 that extends between the two ear members 28, as seen in FIG. 7, and a notch 38 formed in the end of temple piece 18 (FIG. 5). When the ears are hinged to the end of the temple members, frame member 12 can be rotated to either the use or non-use position. When rotated to the use position or mode, the main frame is restricted to a perpendicular or vertical arrangement from that of the horizontal position of the temple members 18 by means of shoulder member 36 that engages notch 38. As shoulder 36 engages notch 38, locking means 34 is also engaged to prevent the rotation of main frame 12 and inadvertently returning it to a horizontal position. Locking means 34 comprises a pair of oppositely disposed nipples 40 which project outwardly from both side walls of the temple members 18, as seen in FIGS. 5 and 6. These nipples are received in a matching pair of recesses 42 formed in the inner walls of ear members 28. In order to change the position of main frame 12 to a horizontal arrangement, the locking means must be forcibly disengaged.

SUMMARY

Head band 16 defines a fixed member and main frame 12 defines a movable member, with the movable member 12 being pivotably mounted to the head member 16 whereby the movable frame 12 is readily positioned in either a vertical mode or a horizontal mode. When the sun glasses are used to protect the eyes of the wearer, the movable frame is placed in a vertical position relative to the temple members so as to be supported on the bridge of one's nose. The second position of the main frame is established when the main frame is rotated approximately 90 degrees to a horizontal position relative to the side temple members 18, and is employed when the wearer thereof removes glasses 10 so as to be hung around his of her neck for safety. This places the main frame 12 and the temple members 18 substantially flat against the chest of the user, as illustrated in FIG. 4.

It can thus be seen that the objects of the present invention set forth herein, as well as those made apparent from the foregoing description are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What I claim is:

1. Sun glasses for use in water sports and like activities wherein the sun glasses comprise:
   a pivotal main frame member including a pair of tinted glass members mounted therein;
   a head band formed from a unitary strap member of semi-hard material having a pair of horizontally disposed side temple members pivotally connected to said main frame member and an integrally formed intermediate bowed section, said bowed section being fixedly arranged in an angularly downward direction from said horizontal side temple members, whereby said bowed section is positioned adjacent the base of the head of a wearer thereof to prevent the inadvertent removal of said sun glasses during a sporting activity and the main frame may be rotated to a horizontal position with respect to the temple members.

2. The invention as recited in claim 1 wherein the angular positioning between said side temple members and said bowed section of said head band is approximately between 130 and 150 degrees.

3. The invention as recited in claim 2 wherein said sun glasses include hinge means affixed to said main frame wherein said distal ends of said side temple members are attached thereto whereby said main frame member is rotatable to a first position and a second position.

4. The invention as recited in claim 3 including:
   means for locking said main frame in said first position and wherein said first position is defined when said main frame member is disposed in a vertical position relative to said horizontal temple members when said main frame rests on the nose of the wearer thereof in a use mode; and
   means for stopping the rotational upward movement of said main frame when said main frame is positioned in said second position and wherein said second position is defined when said main frame member is disposed in a horizontal position relative to the parallel horizontal position of said temple members, said second position being arranged when said side temple members rest against the chest of the wearer and said bowed section rests against the back of the neck of the wearer thereof in a non-use mode.

5. The invention as recited in claim 4 wherein said hinge means comprises:
   a pair of extended ear members integrally formed with said main frame member; and
   a pin mounted in said ear members and through said distal end of said head band.

6. The invention as recited in claim 5 wherein said locking means comprises an outward projection and a recess located between said ear members and said side temple member.

7. The invention as recited in claim 6 wherein stop means is defined by a notch formed in the distal end of said side temple members and a shoulder member interposed between said ear members whereby said shoulder member engages said notch when said main frame is in a vertical position.

* * * * *